(12) United States Patent
Delvat

(10) Patent No.: US 8,782,059 B2
(45) Date of Patent: Jul. 15, 2014

(54) SYSTEMS AND METHODS FOR SELECTING AND IMPORTING OBJECTS

(75) Inventor: Julien Delvat, Antibes Juan les Pins (FR)

(73) Assignee: SAP AG, Walldorf (DE)

(*) Notice: Subject to any disclaimer, the term of this patent is extended or adjusted under 35 U.S.C. 154(b) by 1534 days.

(21) Appl. No.: 11/480,415

(22) Filed: Jul. 5, 2006

(65) Prior Publication Data

US 2007/0260593 A1    Nov. 8, 2007

(30) Foreign Application Priority Data

May 2, 2006  (EP) ..................................... 06290714

(51) Int. Cl.
*G06F 17/30* (2006.01)
(52) U.S. Cl.
USPC .......................................... 707/754; 707/708
(58) Field of Classification Search
USPC ........................................ 707/3–4, 708, 754
See application file for complete search history.

(56) References Cited

U.S. PATENT DOCUMENTS

| | | | |
|---|---|---|---|
| 7,203,945 B2 * | 4/2007 | Kravtchenko et al. | 719/313 |
| 2005/0021522 A1 | 1/2005 | Herman et al. | |
| 2005/0283374 A1 | 12/2005 | Salomon et al. | |
| 2006/0173873 A1 * | 8/2006 | Prompt et al. | 707/100 |

OTHER PUBLICATIONS

London Computer Systems, Inc., "Rent Manager User's Guide Version 2.0.180"—section "How to Import Information," Internet Publication, 2004 (13 pages).
U.S. Army Corps. of Engineers, "HEC-GeoRAS GIS Tools for Support of HEC-RAS Using ArcGis—Chapter 5," Internet Publication, Sep. 2005 (20 pages).
Communication and Search Report from the European Patent Office, dated Sep. 12, 2006 (7 pages).
Catherine Plaisant et al., "Interface and Date Architecture for Query Preview in Network Information Systems," ACM Transactions on Information Systems, vol. 17, No. 3, Jul. 1999, pp. 320-341.
Microsoft Dynamics, "5 Ways to Import Data," Mar. 10, 2006 (3 pages).
Progress Software Corporation, "Progress DataXtend CE for C++ Evaluation Guide," Version 9.1, Oct. 2005 (20 pages).
Communication and Search Report from the European Patent Office in Application No. 07290059.0, dated Apr. 10, 2007 (10 pages).

* cited by examiner

*Primary Examiner* — Rehana Perveen
*Assistant Examiner* — Tiffany Thuy Bui
(74) *Attorney, Agent, or Firm* — Finnegan, Henderson, Farabow, Garrett & Dunner, LLP

(57) ABSTRACT

Systems and methods are provided for selecting and importing objects. In one implementation, a computer-implemented method is provided for selecting objects for importation. Each object includes data and related processes. In the method, a search query is received including an object type. The object type identifies two or more key fields that uniquely identify the object type specified in the search query. A filter selection is received, which includes one or more values of characteristics or key figures of the specified object type. A database is searched and objects of the specified object type that meet the filter selection are identified. A result is returned to a user indicating the identified objects.

22 Claims, 9 Drawing Sheets

| FIELD | DB KEY | BUSINESS KEY |
|---|---|---|
| ID | 101 | identifier |
| Field 1 | 567 | order |
| Field 2 | 123 | plant |
| Field 3 | 15 | material |
| Field 4 | 2 | volume |
| Field 5 | 3 | cost |

| FIELD | DB KEY | BUSINESS KEY |
|---|---|---|
| ID | 101 | identifier |
| Field 1 | 567 | order |
| Field 2 | 123 | plant |
| Field 3 | 15 | material |
| Field 4 | 2 | volume |
| Field 5 | 3 | cost |

FIG. 1A

| FIELD | DB KEY | BUSINESS KEY |
|---|---|---|
| ID | 106 | identifier |
| Field 1 | 2 | version |
| Field 2 | 1010 | created on |
| Field 3 | 44 | created by |
| Field 4 | 815 | database |

FIG. 1B

Select and Insert Objects ☒

700

- • Start
- • Select Object Type
- △ Filter
- ▣ Select Objects
- ▣ Complete

710

Enter the selection values for the selected object type.

| | Selection | Selection | Key |
|---|---|---|---|
| Short Description | | | |
| External Identifier | | | ✓ |
| Project Version | ⧉ | 1 | ✓ |
| Created On | | | |
| Created By | | | |
| Status | | | |
| Origin | | | |
| Database | | | |
| Opportunity strategic importance | | | |
| Opportunity Type | | | |
| Opportunity Proposed Mfg Location | | | |
| Valuation Date | | | |

750

⧉ Back  720
⧉ Continue  730
✕ Cancel  740

FIG. 7

SYSTEMS AND METHODS FOR SELECTING AND IMPORTING OBJECTS

This application claims the benefit of priority from European Patent Application No. 06290714.2, filed May 2, 2006, the entire contents of which are expressly incorporated herein by reference.

BACKGROUND

I. Technical Field

The present invention generally relates to the field of data processing and importing objects. More particularly, the invention relates to computerized systems and methods for implementing a multi-step importation tool for selecting objects for importation.

II. Background Information

In today's information dependent workplace, data is often stored in local or external systems that are available over a network. To accomplish their jobs, workers must access and analyze large quantities of data stored in a variety of locations. For example, a worker using a software application may require data that was created by another worker with another software application. As a result, the worker must import the required data. "Importing" is the process of bringing data created in one application into another application. For example, data created and stored on a server may be required by a worker at a terminal. Accordingly, the worker must import the data from the server to a software application executing on the terminal. Once the data has been imported, the worker may access and analyze the data.

When importing data to a software application, the data that is imported must be encoded or formatted in a manner that the software application understands. Otherwise, the software application will be unable to recognize and process the data. The specific structure in which information is encoded is called a "data format." Since data formats are specific to particular software applications, the data that a worker may wish to access and analyze might be encoded in a variety of data formats. For example, generic software applications allow users to define their own data formats, resulting in data that is stored in many different user-defined data formats. As a result, when such data is imported, it must often be converted to a data format that is recognized by the software application to which it is being imported.

Due to a lack in uniformity between data formats and between data formats used by different software applications, the importation process can be complex. A user may be required to specify the type of data format that the user wishes to import, for example. Furthermore, a source database may store a collection of related data as separate "records" and each record may arrange data in individual elements called "fields." The importation process may require the user to specify or adjust field sizes of the target database in order to ensure that the target database can accommodate the imported data. Due to these complexities of importing data, the procedure for successfully importing data is not always evident to the end user and it is often difficult for the end user to identify with precision the data that the user requires. As a result, a user might select a larger amount of data to import than actually needed.

Importing a large amount of data can affect the performance of a system. For example, a significant amount of system resources are require when a large batch of data is imported. Further still, the conversion of data from one data format to another during the importation process may consume a significant amount of resources. As a result, the larger the volume of data to be imported, the more resources that are needed in order to import the data.

Therefore, conventional importation techniques are limited and suffer from one or more drawbacks. Such solutions are typically not flexible enough to provide users with a simple process for importing data. In addition, because users often are unable to select data with any specificity, some data is often imported needlessly, consuming system resources.

In view of the foregoing, there is a need for improved systems and methods for importing data. For example, there is a need for systems and methods that implement a multi-step importation process that divides the process into steps easily understood by users. There is also a need for systems and methods that allow a user to import only the data that is needed in order to conserve system resources. Therefore, a multi-step importation process is needed that is both easily understood by users and that allows users to more accurately select the data for importation.

SUMMARY

Consistent with an embodiment of the present invention, a computer-implemented method is provided for selecting objects for importation. Each object may include data and related processes. The method may comprise receiving a search query including an object type. The object type may identify two or more key fields that uniquely identify the object type specified in the search query. A filter selection may be received that includes one or more values of characteristics or key figures of the specified object type. The method also comprises searching a database and identifying objects of the specified object type that meet the filter selection. A result may be returned to a user indicating the identified objects.

Consistent with another embodiment of the present invention, a system is provided for selecting objects for importation. Each object may include data and related processes. The system may comprise a graphical user interface module. The graphical user interface module may be adapted to enable a user to specify a search query including an object type. An identification module may identify two or more key fields of the object type specified in the search query. The two or more key fields may uniquely identify the specified object type. A filter module may search a database and identify objects of the specified object type that meet a filter selection. The filter selection may include one or more values of characteristics or key figures of the specified object type.

Consistent with yet another embodiment of the present invention, a computer readable medium is provided for importing objects using a data processing system according to a method. Each object may include data and related processes. The method may comprise receiving a search query including an object type. The object type may identify two or more key fields that uniquely identify the object type specified in the search query. A filter selection may be received that includes one or more values of characteristics or key figures of the specified object type. The method also comprises searching a database and identifying objects of the specified object type that meet the filter selection. A result may be returned to a user indicating the identified objects.

It is to be understood that both the foregoing general description and the following detailed description are exemplary and explanatory only and are not restrictive of the invention or embodiments thereof, as claimed.

BRIEF DESCRIPTION OF THE DRAWINGS

The accompanying drawings, which are incorporated in and constitute a part of this disclosure, illustrate various embodiments and aspects of the present invention. In the drawings:

FIGS. 1A and 1B illustrate exemplary object types, consistent with an embodiment of the present invention;

FIG. 7 illustrates an exemplary graphical user interface of a filter selection screen, consistent with an embodiment of the present invention;

DESCRIPTION OF THE EMBODIMENTS

Figure 2:
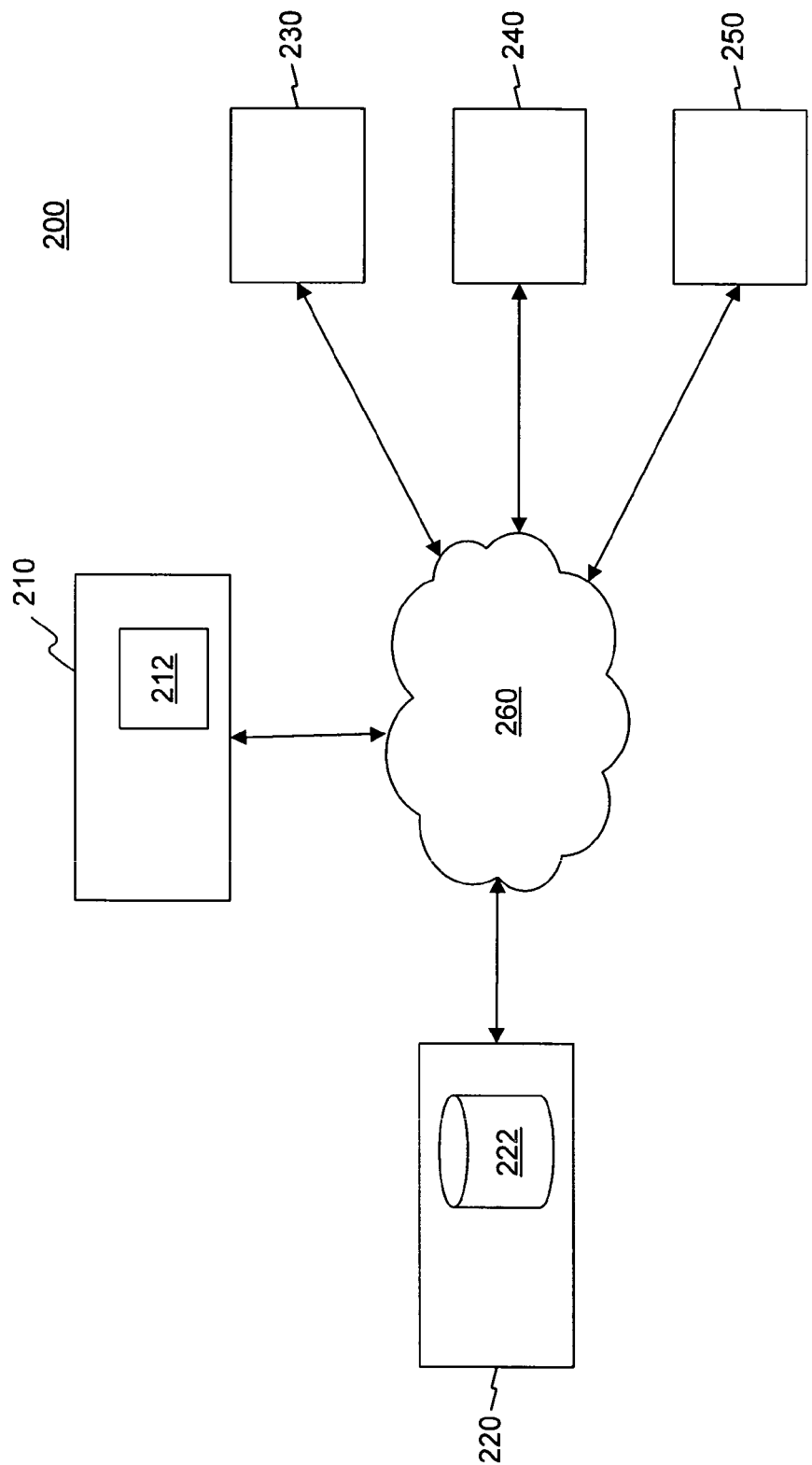
FIG. 2 illustrates an exemplary system for importing objects, consistent with an embodiment of the present invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding steps to the disclosed methods. Accordingly, the following detailed description does not limit the invention. Instead, the proper scope of the invention is defined by the appended claims.

Systems and methods consistent with the present invention may provide a user interface for selecting and importing objects according to a multi-step importation process. As used herein, an "object" refers to a software bundle of variables (e.g., data) and may include related methods. In object-oriented programming, an object is a concrete realization (instance) of a class that consists of data and may also include operations associated with that data. The term "business object" may represent a physical or logical object of significance to a business, such as a purchase order, GL Account, production order, project, product cost estimate, and the like. Accordingly, business objects may represent concrete or abstract objects, as well as activities or processes, and may be used to model and further process objects occurring in an organization, such as a company. Certain processing options, such as "display," "change" or "send," may be available for each business object. As used herein, the term "object" is used to refer to any kind of object, including business objects.

Objects may be of different object types. An "object type" refers to a classification of an object according to the kind of data stored in the object. Examples of object types include purchase orders, business orders, resources, activities, materials, and employees. Each object may also be defined by one or more fields of data called characteristics and key figures. "Characteristics" of an object refer to data of a qualitative nature that describe the object. For example, characteristics may include data identifying a plant, a material, an order, or a customer. On the other hand, "key figures" of an object refer to data of a quantitative nature. For example, key figures may include data identifying a volume or a price. Key figures are typically basic numbers (for example, absolute numbers such as individual values, totals, differences, or averages) or relationship numbers (for example, relative numbers such as structural numbers, relation numbers, or index numbers). Thus, key figures of an object are described in more detail by the characteristics of the object.

As used herein, the term "software application" encompasses any and all types of software, including computer software, computer program products, and program modules and components, including business and financial software applications and components. A software application may uniquely identify an object by a database key (DB). A "database key" may be a numerical value, such as a GUID (Global Unique Identifier). On the other hand, to users of the software application, objects are uniquely identified by a business key. A "business key" may be a name, such as a plant, material, controlling area, or cost center, for example. Since a business key is descriptive name, users are more likely to remember business keys rather than numerical database keys.

Furthermore, one or more characteristics of an object may be considered to be a "key field." Key fields may be used to locate objects of a particular object type. For example, in order to locate a particular object, a software application may look for objects having certain key fields. By identifying objects that have the certain key fields, a user or software application may identify objects of a particular type.

Referring now to FIG. 1A, an exemplary object is shown that is of a "purchase order" type, consistent with an embodiment of the present invention. As part of a purchase order type object, there are several fields that store data. Each field may have a database key and a business key. For example, as shown in FIG. 1A, the purchase order object includes numerical values (i.e., 101, 567, 123, 15, 2, and 3) in the database fields and corresponding business keys describing the numerical values (i.e., identifier, order, plant, material, volume, and cost). In this particular example, the identifier and order fields may be considered key fields because they identify a unique object; that is, they identify an object of a purchase order type. Thus, in order to locate all objects of a purchase order type, a user of a software application could search a database of objects to locate those objects that include both an identifier field and an order field. Furthermore, a user wishing to locate a purchase order type object for a particular material may specify the material, if known.

Turning to FIG. 1B, another exemplary object is shown that is of a "project" type, consistent with an embodiment of the present invention. As part of the project type object, there are several fields that store data. Each field may have a database key and a business key. For example, as shown in FIG. 1B, the project object includes numerical values (i.e., 106, 2, 1010, 44, and 815) in the database fields and corresponding business keys describing the numerical values (i.e., identifier, version, created on, created by, and database). In this particular example, the identifier and version fields may be considered key fields because they identify an object that is of a project type. Thus, in order to locate all objects of a project order type, a user or a software application could search a database of objects to locate those objects that include both an identifier field and a version field. Furthermore, a user wishing to locate a project type object for a particular version of the project may specify the version number, if known.

One of skill in the art will recognize that the above object type definitions discussed in connection with FIGS. 1A and 1B are exemplary and that a variety of other object type definitions may be used, consistent with embodiments of the present invention. For example, users may wish to import objects of the above exemplary types and of other object types. Furthermore, due to the emergence of business objects and services, as well as the extensive nature of software applications that use business objects, the amount of business objects that are available for a user has dramatically increased. When a user wishes to import objects into a software application, for ease of use, the user may wish to select objects for importation based on business keys instead of database keys. For example, referring again to the exemplary objects shown in FIGS. 1A and 1B, selecting an object based on business keys is preferred because a user can more easily and readily identify business keys as compared to the database keys. By contrast, since each object type has a different definition, identifying database keys associated with a desired object is difficult for a user.

Accordingly, embodiments consistent with the present invention provide systems and methods that allow for the selection and importation of objects using business keys, facilitating a more user-friendly experience. Furthermore, systems and methods consistent with embodiments of the present invention provide a multi-step importation process that allows users to select the objects that they require with greater specificity, allowing the user to decrease the amount of data to be imported. Still further, systems and methods consistent with the present invention provide a generic importation tool that allows users to import objects of any object type.

FIG. 2 illustrates an exemplary system 200 for importing objects, consistent with an embodiment of the present invention. As shown in system 200, application server 210, repository server 220, and terminals 230, 240, and 250 are connected to a network 260. One of skill in the art will appreciate that although two kinds of servers and three terminals are depicted in FIG. 2, any number of servers and terminals may be provided. Furthermore, one of ordinary skill in the art will recognize that functions provided by one or more components of system 200 may be combined. For example, application server 210 and repository server 220 may be implemented as one server.

Network 260 provides communications between the various entities in system 200, such as application server 210, repository server 220, and terminals 230-250. In addition, application server 210, repository server 220, or terminals 230-250 may access legacy systems (not shown) via network 260, or may directly access legacy systems and/or databases.

Network 260 may be a shared, public, or private network and encompasses a wide area or local area. Network 260 may be implemented through any suitable combination of wired and/or wireless communication networks. Furthermore, network 260 may comprise a local area network (LAN), a wide area network (WAN), an intranet, or the Internet.

Application server 210 may comprise a general purpose computer (e.g., a personal computer, network computer, server, or mainframe computer) having a processor (not shown) that may be selectively activated or reconfigured by a computer program to perform one or more methods consistent with the present invention. Application server 210 may also be implemented in a distributed network. Alternatively, application server 210 may be specially constructed for carrying-out methods consistent with the present invention. Furthermore, application server 210 may include a data storage 212 for storing program modules that implement an importation tool. Program modules for implementing an importation tool are discussed in further detail with respect to FIG. 3.

Repository server 220 may include a database 222. Database 222 may be implemented with any one of a number of commercially available repositories. However, in a preferred embodiment, the Enterprise Services Repository from SAP AG is used. Furthermore, repository server 220 may employ any of a number of commercially available database systems, such as Microsoft Access, dbase, Oracle, Sybase, etc.

Database 222 may act as repositories for storing objects. Furthermore, repository server 220 may be available via network 260 and may interact with software executing on application server 210 and/or or with software executing on terminals 230-250. For example, objects stored in database 222 may be accessed by any of application server 210 or terminals 230, 240, or 250. Objects may be retrieved from database 222 and transmitted over network 260 to terminals 230-250 at the direction of application server 210, for example. Furthermore, objects may be stored in any one of terminals 230, 240, or 250.

For example, in at least one embodiment, objects stored in database 222 may be accessed by means of Business Application Programming Interfaces (BAPI), a well-known and widely used application interface used to achieve interoperability between various systems and to integrate third party software components with the software offered by SAP AG. In another exemplary environment, such as one using an existing SAP NetWeaver architecture, the Enterprise Services Infrastructure (ESI) provides access to the objects.

Terminals 230-250 may be any type device for communicating with application server 210 and/or repository server 220 over network 240. For example, terminals 230-250 may be personal computers, handheld devices, or any other appropriate computing platform or device capable of exchanging data with network 260. Terminals 230-250 may each include a processor (not shown) and data storage (not shown) for storing data, such as objects that have been imported from repository server 220.

For example, terminals 230-250 may execute program modules that provide one or more graphical user interfaces (GUIs) for interacting with network resources to import objects and/or may execute a web browser for accessing network resources through a web portal. Users may access data stored in repository server 220 via network 260 through a web browser or software application running on, for example, any one of terminals 230-250.

For example, a web portal may include options for allowing a user to log onto a secure site provided by application server 210 by supplying credentials, such as a username and a password. Once logged onto the site, the web portal may display a series of screens prompting the user to make various selections for importing objects. Since embodiments of the present invention may be implemented using an HTTPS (hypertext transfer protocol secure) environment, data transfer over a network, such as the Internet, may be done in a secure fashion.

Consistent with an aspect of the present invention, a web interface generated by application server 210 that is displayed to users of terminals 230-250 may provide various options. For example, a user may select, using the web interface, an object importation tool. In other embodiments, users of terminals 230-250 may select an object importation tool from an GUI generated by software executing on one of terminals 230-250.

Consistent with embodiments of the present invention, a multi-step importation process may allow a user to select a database from which to import objects. The user may then select an importation tool that provides an introduction to the user, such a welcome screen that welcomes users to the importation tool. Furthermore, the process may allow the user to select object types, filter objects of the selected type, select specific objects for importation, and provide a final confirmation of the objects to be imported. Embodiments of the present invention may be used with various solutions and within numerous environments in order to provide flexibility to import objects of any object type. By way of example, embodiments of the invention may be implemented in computerized systems or methods that incorporate business warehouse solutions from SAP AG (Walldorf, Germany).

Figure 3:
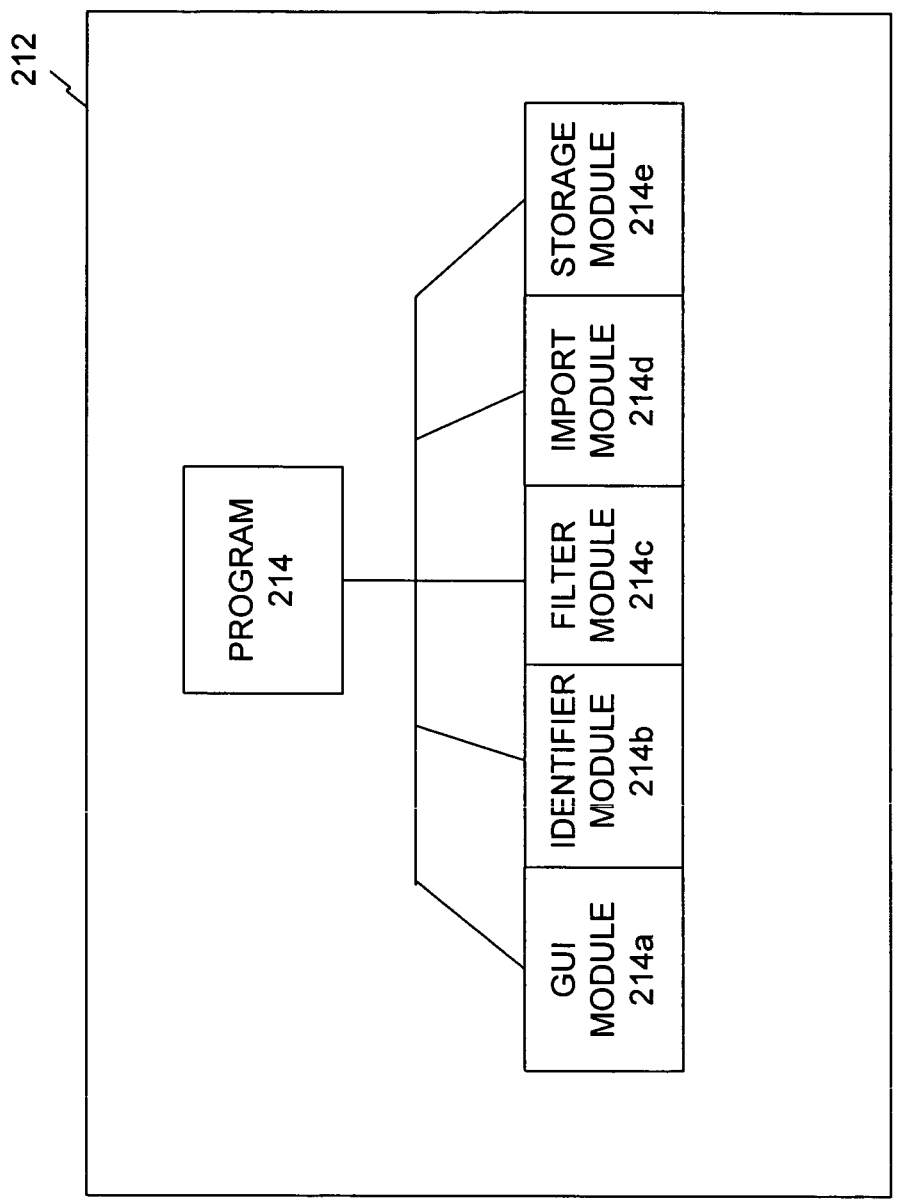
FIG. 3 is an exemplary software architecture for providing a multi-step object importation tool, consistent with an embodiment of the present invention.

FIG. 3 shows an exemplary software architecture for providing a multi-step object importation tool, consistent with an embodiment of the present invention. The software architecture may be stored in data storage 212, as shown in FIG. 2, for example. In one embodiment, data storage 212 stores instructions of program 214, which when executed, perform the functions of an object importation tool.

To implement the object importation tool, program 214 may include instructions in the form of one or more software modules 214a-214e. Software modules 214a-214e may be written using any known programming language, such as ABAP, XML, etc. A GUI module 214a may provide processing to display data and receive data selections from users of the importation tool. For example, GUI module 214a may process user selections of databases, object types, values entered by users for filtering objects, and user selections of objects for importation. An identifier module 214b may identify objects of a selected object type that are stored in one or more external database by processing a search query. For example, a user may specify the search query by selecting an object of a particular object type. The search query may be submitted to identifier module 214b, which may identify objects having the same key fields as the selected object. A filter module 214c may filter objects of the selected object type according to values provided by a user. A user may provide one or more values in order to locate objects of the selected object type that have the desired values. For example, a user may decide to filter based on a value such as a version number, the date an object was created, or a person that created an object, and the like. An importation module 214d may import objects from external servers, systems, and/or databases, and the like. A storage module 214e may save imported data for persistent storage.

While the example provided in FIG. 3 shows program modules 214a-214e as being resident in data storage 212 of application server 210, one of ordinary skill in the art will appreciate that program modules 214a-214e may be stored in data storages of any one of terminals 230, 240, or 250, for example.

Figure 4:
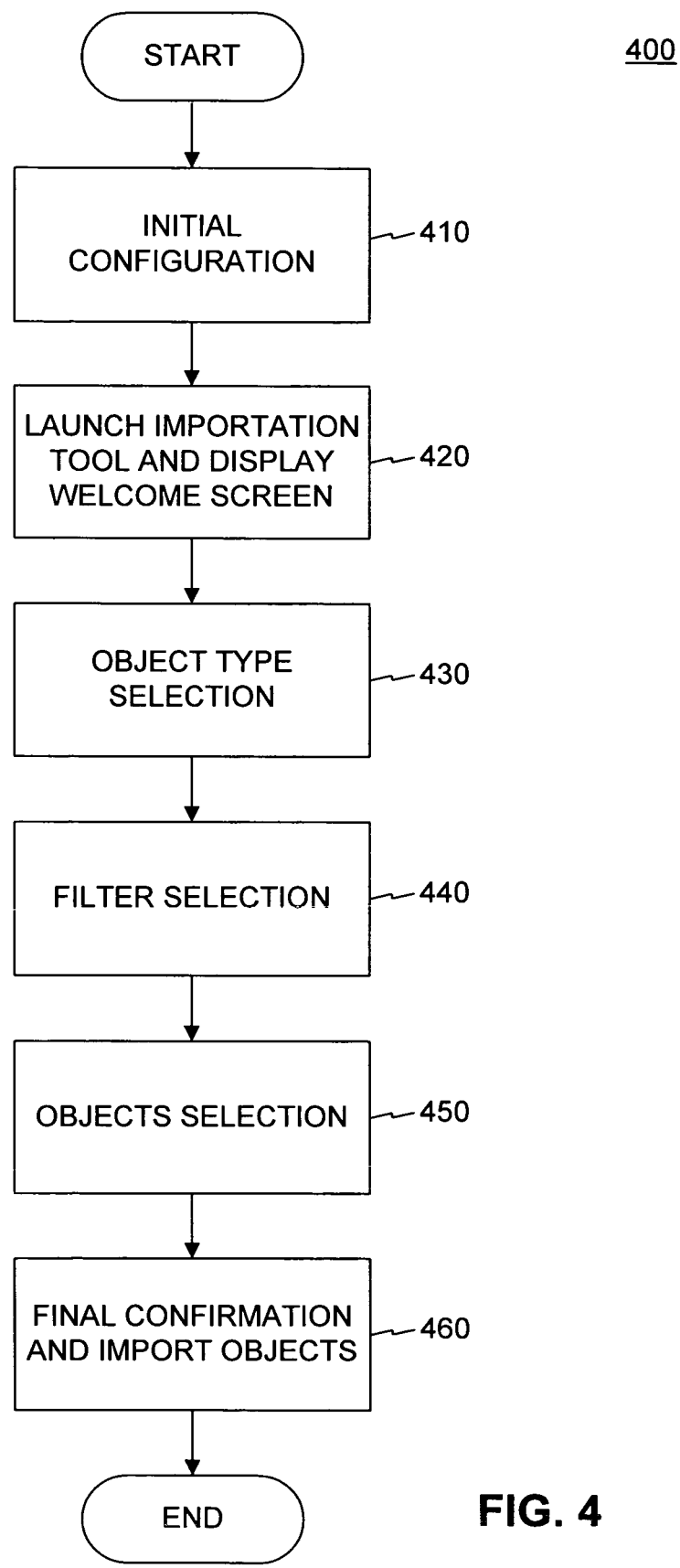
FIG. 4 is a flow diagram of an exemplary method for importing objects, consistent with an embodiment of the present invention.

Referring now to FIG. 4, a flow diagram 400 is provided of an exemplary method for importing objects using a data processing system, consistent with an embodiment of the present invention. The method may implement a multi-step importation process that provides a user with options for selecting objects according to a series of steps. For example, a user may identify objects of a certain type and filter the objects of the selected type in order to locate desired objects.

At the start of the process, a user may set up an initial configuration before launching the object importation tool (Step 410). For example, a user may select a database from which the user wishes to import objects. The process then proceeds to step 420. Accordingly, when the user reaches the object type selection screen (discussed later in connection with step 430 and FIG. 6), object types that are stored in the selected database are displayed.

In step 420, the object importation tool may be launched and a welcome screen may be displayed. For example, the user may select an importation tool icon to launch the importation tool. As part of this step, a user interface (such as a GUI 500 shown in FIG. 5) may be displayed and may prompt the user to make a selection. The welcome screen may include a short message welcoming the user to the importation tool and may also include options from which the user may select. For example, options available on the welcome screen may include continue or cancel. GUI 500 may be generated by, for example, GUI module 214a, as discussed above in connection with FIG. 3.

Figure 6:
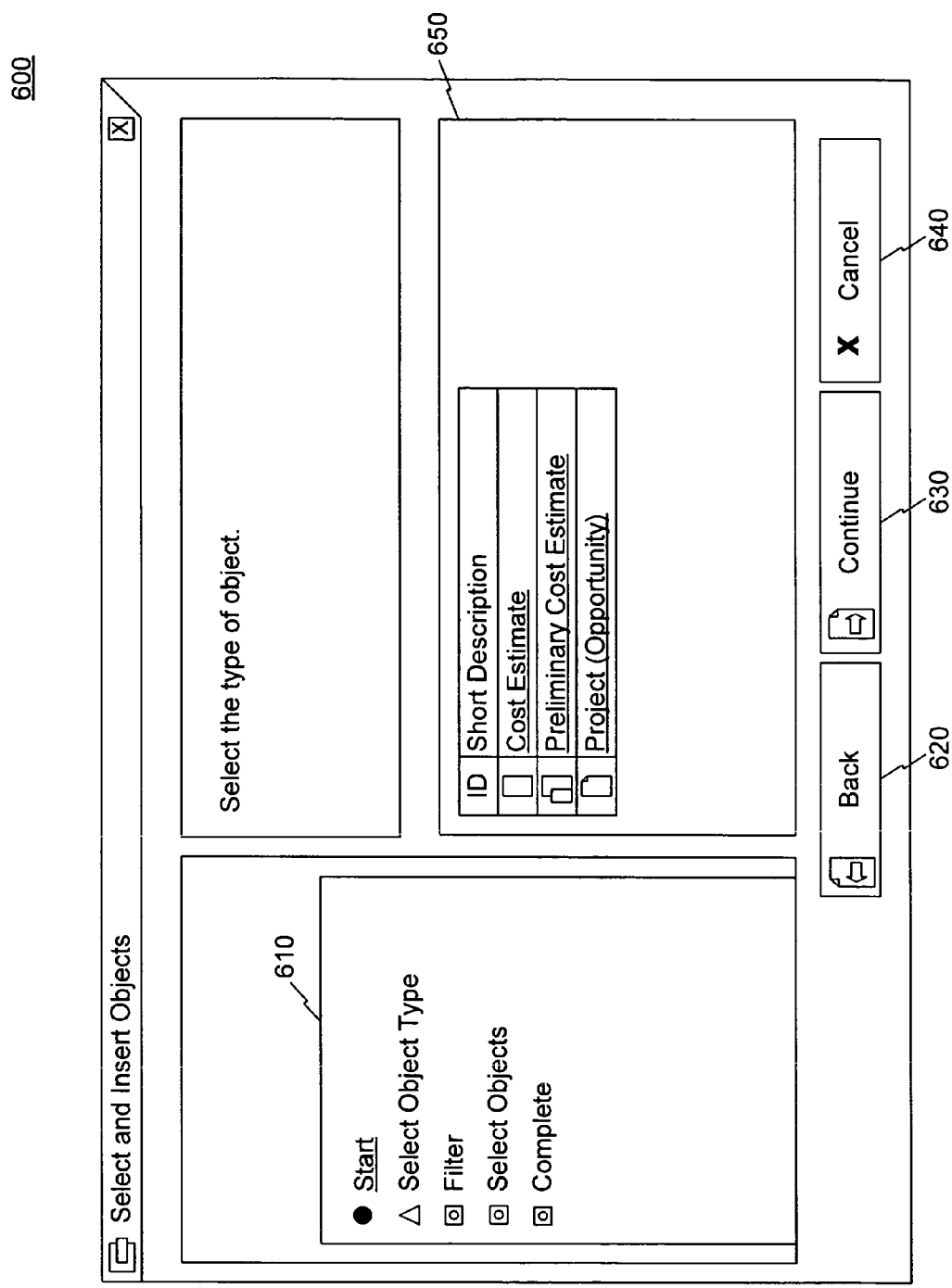
FIG. 6 illustrates an exemplary graphical user interface of an object type selection screen, consistent with an embodiment of the present invention.

Next, an object type selection may be received by the importation tool. (Step 430). For example, FIG. 6 shows an exemplary screen for selecting objects, which is discussed below in further detail. As shown in FIG. 6, object types available in the database that was selected in step 410 are displayed. Furthermore, in step 430, the user may submit a search query that identifies an object type. For example, returning to the example object type discussed above with respect to FIG. 1B, the user may select a project type object from a list of objects. The user may submit the search query and objects of the selected object type may be identified by using one or more key fields of the object type. For example, objects having certain key fields may be identified as belonging to the selected object type. The search query may be processed by, for example, identifier module 214b in order to identify objects of the selected object type. Once the selection is made, the importation tool may display the characteristics and key figures of the selected object type (see, e.g., FIG. 7).

Next, the importation tool may receive a filter selection. (Step 440). A filter selection may allow a user to further refine the selected objects that will be imported based on characteristics and/or key figures of the object type. For example, returning again to the prior example discussed above with respect to FIG. 1B, a user wishing to locate a project type object for a particular version of the project may specify the version number, if known. Accordingly, the importation tool would only import objects of a project type having the desired version.

In the example discussed above, one or more values are provided by a user that may correspond to one or more business keys. The importation tool may include functions, such as filter module 214c, for determining objects of the selected object type that include the desired business keys. Accordingly, filter module 214c may implement program instructions for determining which, if any, of the objects that were identified as being of selected object type in step 430 include business keys corresponding to the values provided by a user. As one of skill in the will appreciate, the user may also desire to import all objects of a particular type and, thus, the filter selection may be optional. The importation tool may then display a list of objects meeting the filter selection criteria (see, e.g., FIG. 8).

Next, the importation tool may receive an object selection of specific desired objects from the filtered results. (Step 450). In this step, the user may select objects from the filtered list (i.e., the user may make selects from the list shown in FIG. 8). As one of skill in the art will again appreciate, this step may also be optional and may be omitted from implementations consistent with the present invention.

Figure 9:
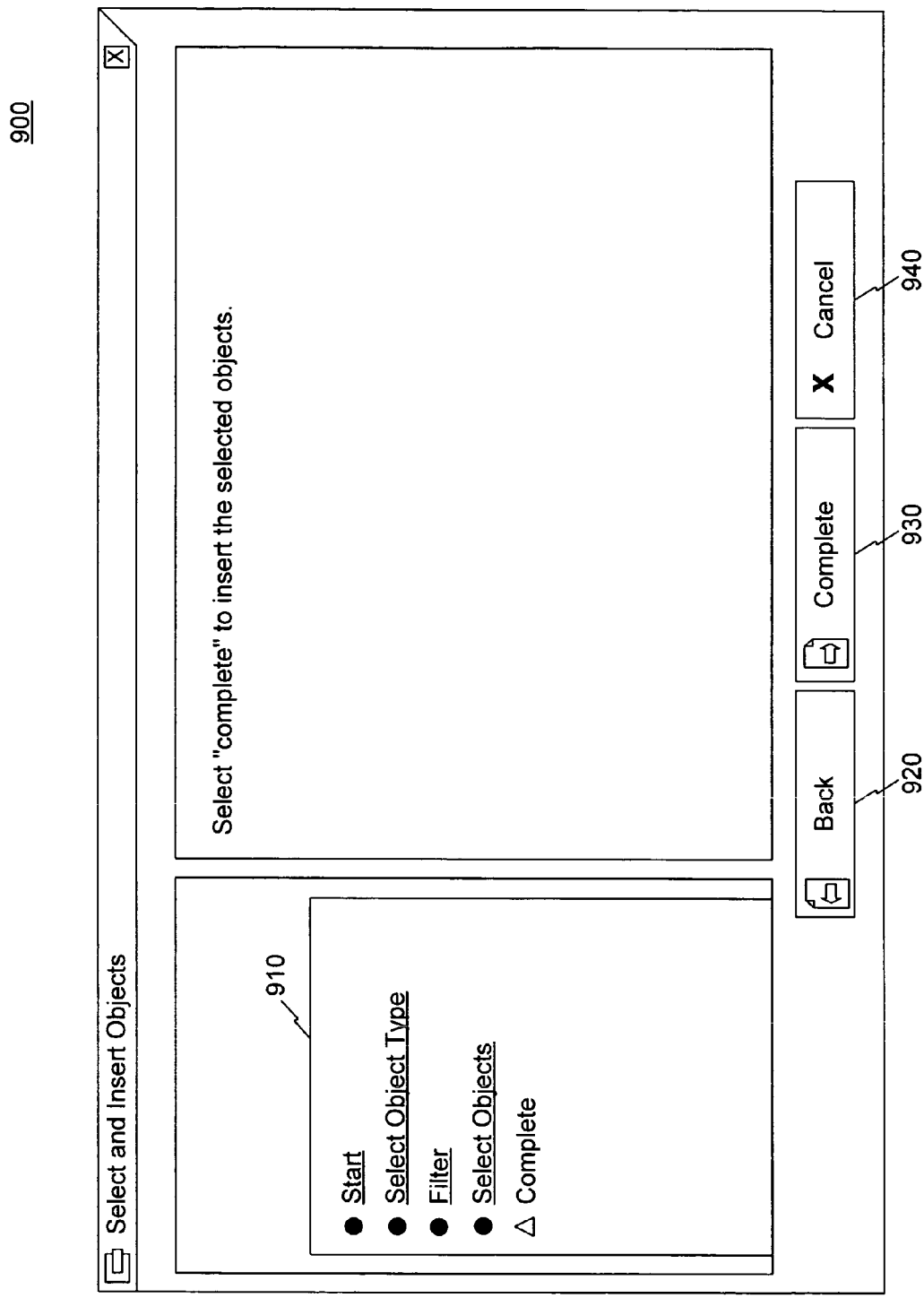
FIG. 9 illustrates an exemplary graphical user interface of a completion screen, consistent with an embodiment of the present invention.

Turning to step 460, the importation tool may receive a final confirmation of the objects that are to be imported. For example, a confirmation screen may be displayed, as shown in FIG. 9, to prompt the user to validate that the selected objects should be imported. When the user validates the selection, the objects meeting the selection criteria may be retrieved from, for example, database 222, and imported into a software application at one of user terminals 230-250. The process then ends.

In an alternative implementation, referring again to step 410, the user may select both a database and an object type. For example, after selecting a database and an object type, the process may then proceed directly to step 440 to filter objects and, accordingly, the user may skip the object type selection screen associated with step 420. Accordingly, when the user reaches the filter screen (previously discussed in connection with step 430 and FIG. 7), the characteristics and key figures of the selected object type are displayed for a filter selection.

As discussed above, systems and methods consistent with the present invention may be implemented using a GUI. In one embodiment, a user may select objects for importation using an importation tool, which may be executed locally on a terminal of the user, or may execute over a network and be displayed in a web browser. Once the user has selected the importation tool, and supplied appropriate credentials, if required, to access the tool, a welcome screen may be displayed. The welcome screen may display a greeting and may appear as a wizard-like GUI, such as that shown in FIG. 5.

Figure 5:
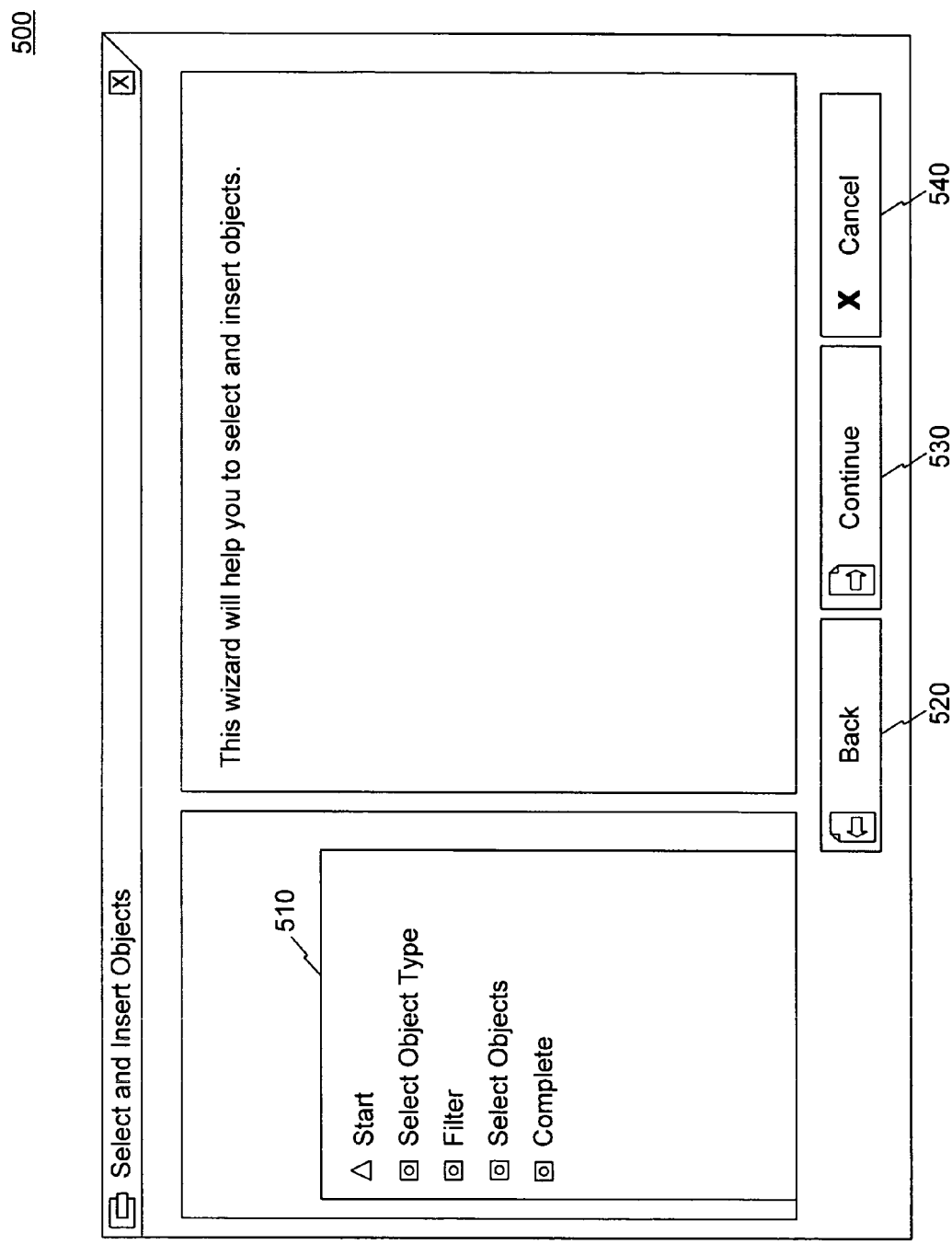
FIG. 5 illustrates an exemplary graphical user interface for welcoming users to an importation tool, consistent with an embodiment of the present invention.

In particular, FIG. 5 is a GUI 500 implementing an exemplary welcome screen that welcomes users to an importation tool, consistent with an embodiment of the present invention. GUI 500 may be displayed once a user logs onto a system, such as a business warehouse system provided by SAP, by submitting for authentication a user name and password, for example. Once logged into the system, the user may select an importation tool, causing GUI 500 to be displayed. In one embodiment, GUI 500 may display a welcome message, such as "This wizard will help you to select and insert objects."

GUI 500 may include a summary 510 of the steps implemented by the importation tool to import objects. For example, as shown in FIG. 5, summary 510 includes a list indicating "Start," "Select Object Type," "Filter," "Select Objects," and "Complete." Furthermore, as illustrated in FIG. 5, GUI 500 may include a plurality of selectable buttons 520, 530, and 540. Buttons 520-540 may be selected, for example, by a user operating a pointing device, such as a mouse. Although a mouse is given as an example of a pointing device, buttons 520-540 may be selected by any appropriate device or may be selectable using a touch screen (not shown). In the example shown in FIG. 5, GUI 500 includes a back button 520, a continue button 530, and a cancel button 540. Since GUI 500 is the first screen shown in the process, back button 520 may be not be selectable and may be grayed-out to indicate it is not an available option. Accordingly, button 530 may be used to navigate to the next step or button 530 may be used to cancel and exit the tool. When the user selects continue button 530, an object type selection screen may be displayed, such as that shown in FIG. 6.

FIG. 6 is a GUI 600 implementing an exemplary object type selection screen, consistent with an embodiment of the present invention. Similar to GUI 600, GUI 600 may include a summary 610 of the steps implemented by the tool to import objects. As shown in FIG. 6, the "Select Object Type" step of summary 610 may designated or highlighted as the current step. Furthermore, GUI 600 may include selectable buttons 620-640 for navigating to the prior screen, continuing, or canceling the process, as discussed in greater detail with respect to FIG. 5.

Furthermore, GUI 600 may include a message prompting the user to select an object type from a list. For example, GUI 600 includes a message stating "Select Object Type." In particular, as shown in FIG. 6, a list 650 of object types is available for selection. Each object type may be described by an ID, such as unique icon, and a short description. Once the user has selected the object type, the user may select continue button 630 to proceed and a filter selection screen may be displayed. In the present example of FIG. 6, assume that a user selects the "Project" object type and continues to a filter selection screen, such as that shown in FIG. 7.

FIG. 7 is a GUI 700 implementing an exemplary filter selection screen, consistent with an embodiment of the present invention. GUI 700 may include a summary 710 of the steps implemented by the tool to import objects. For example, the "Filter" step of summary 710 may be highlighted or otherwise designated as the current step. Furthermore, GUI 700 may include selectable buttons 720-740 for navigation. A message displayed on GUI 700 may prompt the user to enter selection values for the selected object type. For example, GUI 700 includes a message stating "Enter the selection values for the selected object type."

GUI 700 may provide functionality for the user to enter specific values to further filter the objects that will be selected for importation. As shown in selection box 750, the available characteristics and key values for the project object may include "External Identifier," "Project Version," "Created On," "Created By," "Status," "Origin," "Database," "Opportunity Strategic Importance," "Opportunity Type," "Opportunity Proposed Manufacturing Location," and "Valuation Date." A user may manipulate a scroll bar in order to view additional characteristics and key figures.

In the example shown in FIG. 7, a user has made a filter selection. In particular, the user has selected projects that are version "1." If a user does not enter any filter selections, all objects having the key values for the selected object type will be imported. Furthermore, as shown in FIG. 7, the first two fields of the project type object (i.e., External Identifier and Project Version) are key fields. Once the user has entered filter selections for the selected object type, the user may select continue button 730 to proceed and an object selection screen, as shown in FIG. 8, may be displayed.

In addition, during the filter selection, once the user has selected continue button 730, a message box may be displayed to the user. The message box may indicate the number of objects that meet the filter criteria. For example, the message box may state, "30 objects have been identified meeting the specified criteria. Would you still like to continue?" The message box may provide options of Yes or No. Then, the user may decide whether to continue or may decide to enter further filter criteria. For example, if the user has identified a large number of objects after specifying the filter criteria, the user may wish to enter additional filter criteria to reduce the number of objects. As another example, a user may only wish to import ten objects or fewer in order to minimize the processing resources and time needed for object importation. Accordingly, a message box displays a message indicating one hundred objects have been identified meeting the filter criteria can alter the user that additional filter values must be specified or narrowed in order to reduce the number of objects that are identified. Furthermore, a user may select a threshold value such that if the number of identified objects exceeds a threshold value, a message box with an appropriate message is then displayed.

Figure 8:
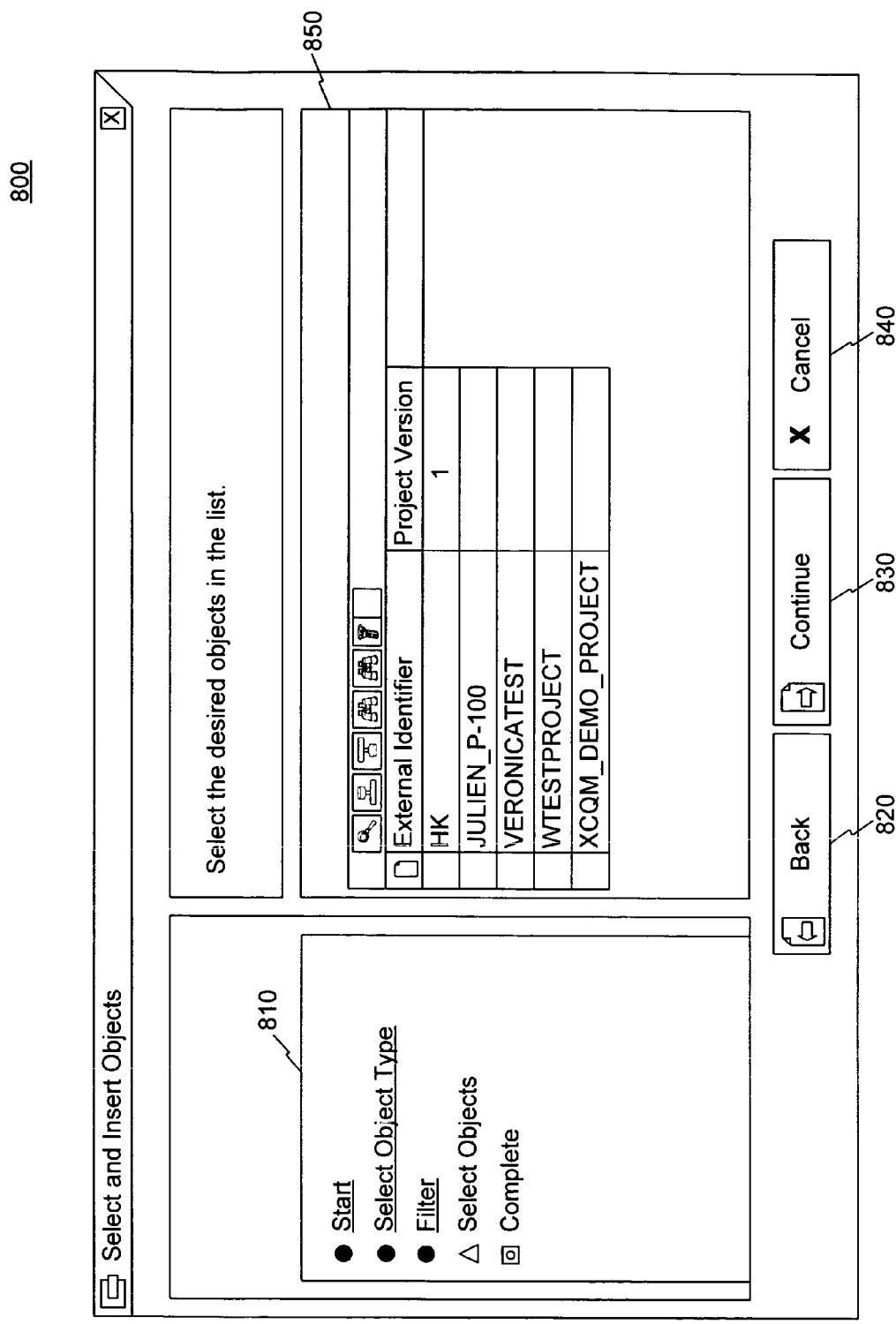
FIG. 8 illustrates an exemplary graphical user interface of an object selection screen, consistent with an embodiment of the present invention.

FIG. 8 is a GUI 800 implementing an object selection screen, consistent with an embodiment of the present invention. GUI 800 may include a summary 810 of the steps implemented by the tool to import objects. For example, the "Select Object Type" step of summary 810 may be highlighted or otherwise designated as the current step. Furthermore, GUI 800 may include selectable buttons 820-840 for navigation. A message displayed on GUI 800 may prompt the user to select desired objects that will be imported. For example, GUI 800 includes a message stating "Select the desired objects in the list."

As shown in FIG. 8, the user may select desired objects from list 850. Alternatively, the user may select all of the objects shown in the list for importation. Once the user has entered any selections, the user may select continue button 830 to proceed and a completion screen, as shown in FIG. 9, may be displayed.

FIG. 9 is a GUI 900 implementing a completion screen, consistent with an embodiment of the present invention. GUI 900 may include a summary 910 of the steps implemented by the tool to import objects. For example, the "Complete" step of summary 910 may be highlighted or otherwise designated as the current step. Furthermore, GUI 900 may include selectable buttons 920-940 for navigation.

As shown in FIG. 900, button 930 is a "Complete" button. A message displayed on GUI 800 may prompt the user to select complete button 930 in order to complete the process and import the selected objects. For example, GUI 900 includes a message "Select 'complete' to insert the selected objects." Once the user selects "complete," the selected objects will be imported into the user's software application. For example, the selected objects may be retrieved from repository server 220 and imported to a software application executed on one of terminals 230-250.

In other embodiments consistent with the present invention, a user may select objects for importation using a hierarchical approach. A "hierarchy" is a list of objects or object types that are organized in successive ranks with the broadest object or object type listed first and with more specific aspects or subdivisions listed below. For example, a hierarchy may be displayed as a tree that a user may expand or collapse. When implementing the above-described systems and methods according to a hierarchical approach, a user may view objects of a selected object type in a hierarchy. Furthermore, a user may filter the selected objects by viewing the objects in a hierarchy and may also select specific objects for importation from a hierarchy. One of ordinary skill in the art will recognize that objects of a selected object type may be arranged and ordered in a variety of different formats that are consistent with the spirit and scope of the present invention.

Accordingly, consistent with the present invention, systems and methods provide a multi-step importation tool. The importation tool may be implemented as a wizard-like GUI providing the user with a series of steps and selection options. Embodiments of the tool provide functionality for a user to select an object type for importation. Furthermore, the user may filter objects of the selected type according to filter criteria and may also select specific objects for importation. Consistent with the present invention, a user may more easily identify the data that the user needs and the amount of data that is imported may be reduced in order to conserve system resources.

The foregoing description has been presented for purposes of illustration. It is not exhaustive and does not limit the invention to the precise forms or embodiments disclosed. Modifications and adaptations of the invention will be apparent to those skilled in the art from consideration of the specification and practice of the disclosed embodiments of the invention. For example, the described implementations include software, but systems and methods consistent with the present invention may be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, or other forms of RAM or ROM.

Computer programs based on the written description and methods of this invention are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets or in SAP R/3 or ABAP. One or more of such software sections or modules can be integrated into a computer system or existing e-mail or browser software.

Moreover, while illustrative embodiments of the invention have been described herein, the scope of the invention includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. Further, the steps of the disclosed methods may be modified in any manner, including by reordering steps and/or inserting or deleting steps, without departing from the principles of the invention. It is intended, therefore, that the specification and examples be considered as exemplary only, with a true scope and spirit of the invention being indicated by the following claims and their full scope of equivalents.

What is claimed is:

1. A computer-implemented method for selecting objects for importation, each object including data and related processes, the method comprising:
   receiving a search query including an object type, the object type identifying two or more key fields that uniquely identify the object type specified in the search query;
   receiving a filter selection, including receiving a selection of one or more filtering parameters of the specified object type and receiving values of the selected filtering parameters;
   searching a database and identifying objects that have the identified two or more key fields and meet the filter selection, wherein the identified objects comprise data and at least one related process; and
   returning a result to a user indicating the identified objects.

2. The computer-implemented method of claim 1, further comprising:
   receiving a selection of the identified objects; and
   importing the selected objects from the database.

3. The computer-implemented method of claim 1, further comprising: importing the identified objects from the database.

4. The computer-implemented method of claim 1, further comprising:
displaying a list of filtering parameters of the selected object type in a graphical user interface.

5. The computer-implemented method of claim 1, wherein the identified objects are displayed as a selectable list in a graphical user interface.

6. The computer-implemented method of claim 1, wherein the identified objects are arranged in a hierarchical directory in a graphical user interface.

7. The computer-implemented method of claim 1, wherein the values of the selected filtering parameters are received via a graphical user interface from a user.

8. The computer-implemented method of claim 2, wherein receiving a selection of the identified objects includes receiving the selection from a user.

9. A system for selecting objects for importation, each object including data and related processes, the system comprising:
a memory storing instructions;
a processor executing the instructions to provide:
a graphical user interface module, the graphical user interface module adapted to enable a user to submit a search query including an object type;
an identification module for identifying two or more key fields that uniquely identify the object type specified in the search query; and
a filter module, receiving a filter selection, for searching a database and identifying objects that have the identified two or more key fields and meet the filter selection, wherein receiving the filter selection includes receiving a selection of one or more filtering parameters of the specified object type and receiving values of the selected filtering parameters, and wherein the identified objects comprise data and at least one related process.

10. The system of claim 9, wherein the filter module returns a result to the user indicating the identified objects.

11. The system of claim 10, further comprising:
an importation module for importing the identified objects from the database.

12. The system of claim 9, wherein the graphical user interface module is further adapted to display a list of filtering parameters of the selected object type in a graphical user interface.

13. The system of claim 9, wherein the identified objects are displayed as a selectable list in a graphical user interface.

14. The system of claim 9, wherein the identified objects are arranged in a hierarchical directory in a graphical user interface.

15. A non-transitory computer-readable storage medium comprising programmable instructions adapted to perform a computer-implemented method for importing objects using a data processing system, each object including data and related processes, the method comprising:
receiving a search query including an object type, the object type identifying two or more key fields that uniquely identify the object type specified in the search query;
receiving a filter selection, including receiving a selection of one or more filtering parameters of the specified object type and receiving values of the selected filtering parameters;
searching a database and identifying objects that have the identified two or more key fields and meet the filter selection; and
returning a result to a user indicating the identified objects, wherein the identified objects comprise data and at least one related process.

16. The non-transitory computer-readable storage medium of claim 15, further comprising:
receiving a selection of the identified objects; and
importing the selected objects from the database.

17. The non-transitory computer-readable storage medium of claim 15, further comprising:
importing the identified objects from the database.

18. The non-transitory computer-readable storage medium of claim 15, further comprising:
displaying a list of filtering parameters of the selected object type in a graphical user interface.

19. The non-transitory computer-readable storage medium of claim 15, wherein the identified objects are displayed as a selectable list in a graphical user interface.

20. The non-transitory computer-readable storage medium of claim 15, wherein the identified objects are arranged in a hierarchical directory in a graphical user interface.

21. The non-transitory computer-readable storage medium of claim 15, wherein the values of the selected filtering parameters are entered into a graphical user interface by a user.

22. The non-transitory computer-readable storage medium of claim 16, wherein receiving a selection of the identified objects includes receiving the selection from a user.

* * * * *